United States Patent Office 2,848,355
Patented Aug. 19, 1958

2,848,355

DELAMINATION TREATED PRESSURE SENSITIVE ADHESIVE TAPE

Charles Bartell, New Brunswick, N. J., assignor to Permacel-Le Page's Inc., a corporation of New Jersey No Drawing. Application May 26, 1955
Serial No. 511,427

16 Claims. (Cl. 117—122)

This invention relates to a normally tacky and pressure-sensitive adhesive sheet material and, more particularly, to a normally tacky and pressure-sensitive adhesive tape formed with a unified paper backing.

Paper-backed, normally tacky and pressure-sensitive adhesive tapes, particularly those used for masking purposes, should have high elongation, good flexibility, high edge tear, good tensile strength both wet and dry, and adequate internal strength to prevent delamination of the backing upon unrolling of the tape. In the case of masking tapes, the product must have high elongation, flexibility and edge tear in order that the tape be curved to mask curved lines without tearing during application. Furthermore, the tape should have high wet tensile strength so that it has adequate strength in humid climates and to withstand wet sanding of surfaces masked by the product. The delamination resistance, or resistance of the backing to being split into two layers by forces perpendicular to the sheet, is necessary to enable unwinding of the tape and removal from the surface after it has served its intended function.

Paper backings for use in pressure-sensitive tapes can be unified or strengthened internally by treatment of the paper with aqueous latices of elastomeric polymers such as butadiene-styrene, butadiene-acrylonitrile, etc. The sheets are impregnated in amount sufficient to deposit substantial rubbery polymer solids in the web to bond the fibers thereof to a degree sufficient to lend the tape high internal strength. In the treatment of paper webs with latices, however, it has been generally found that the edge tear, elongation and flexibility of the sheet suffered considerably whenever ingredients were incorporated in the latex for the purpose of increasing the wet tensile strength and delamination resistance of the product. Obviously, a balancing of the characteristics of the tape is necessary to obtain a successful commercial product and increasing one property to the severe detriment of others is not advantageous.

Accordingly, it is an object of this invention to provide a unified paper web suitable for use as a backing element for a normally tacky and pressure-sensitive adhesive sheet wherein the backing has the characteristics of high flexibility, elongation and edge tear and yet high wet tensile strength and delamination resistance.

It is an additional object of this invention to provide a masking tape having the aforementioned properties and, hence, suitable for use in those applications requiring high wet tensile strength and delamination resistance.

It is a further and more specific object of this invention to provide an impregnant composition for saturating paper webs to form backing elements with balanced properties of edge tear, flexibility, elongation, tensile strength wet and dry, and delamination resistance.

These and other objects of the invention will become apparent when consideration is given to the hereinafter detailed description of this invention.

In accordance with this invention, an open, porous, saturable paper web is treated with an aqueous dispersion including an elastomeric copolymer of acrylonitrile together with a minor amount of a water-dispersible or water-soluble heat-advancing phenolic-aldehyde resin. It has been found that if a small amount of a phenolic-aldehyde resin, i. e. about 0.5 to 7% by weight of impregnant solids, is added to a latex of an elastomeric copolymer of acrylonitrile and the composition thus formed used to impregnate a paper web which is thereafter cured by the application of heat, a backing sheet for a pressure-sensitive tape is obtained that unexpectedly exhibits high elongation, flexibility and edge tear and yet high wet tensile strength and delamination resistance. It has been found possible to increase the wet tensile strength of the sheet by as much as 700% and increase its delamination resistance considerably without any substantial sacrifice in elongation, edge tear, and flexibility. It has also been found, surprisingly, that when substantially higher amounts of such phenolic-aldehyde resins are used in the composition in amount, for example, about 10 or 20%, these unexpected results were not obtained. Specifically such higher amounts of phenolic-aldehyde resin increase the wet tensile strength and the delamination resistance of the paper sheets but decrease the characteristics of elongation, edge tear, and flexibility.

Tapes formed with paper backings made in accordance with this invention, that is, impregnated with such a composition and thereafter cured, have been found to perform excellently under humid and wet conditions. To test their resistance to high humidity, tapes made from the backings in accordance with this invention were compared with backings impregnated with the same latex composition except that no phenolic resin was employed. The tape samples were aged three days at 150° F. and 100% relative humidity. It was practically impossible to unwind the tapes formed with the impregnant excluding the phenolic resin without substantially complete delamination or splitting of the paper element, whereas tapes formed with the impregnant including the phenolic resin unwound easily without delamination. A similar distinction was encountered during wet sanding tests which are frequently used in masking operations. Tapes made with paper backings impregnated with a composition excluding a phenolic resin tend to become weak from the water taken up during wet sanding and break into pieces upon being removed from the surface to which they are applied. Tapes formed in accordance with this invention remain intact and can be easily removed in one piece.

Heretofore, considerable effort has been devoted to modifying latex impregnants used to unify paper webs for pressure-sensitive tapes, and some benefits in the properties of the tape described in the preceding paragraphs have been obtained. However, backings formed with such modified latices which have had imparted to them increased wet tensile strength and delamination resistance have exhibited poor elongation, edge tear and flexibility. In fact, an increase in the phenolic content of an impregnant formed in accordance with this invention over and above about 7% results in a similar decrease of these desirable properties. For example, it has been found that the use of the phenolic resin in the acrylonitrile containing elastomeric copolymer impregnant of this invention in amounts higher than about 7% cause the elongation, edge tear and flexibility characteristics of the backing to deteriorate suddenly and drastically; consequently, tapes made with greater amounts of phenolic resin than used in this invention are decidedly inferior to the products of the invention. As an illustration, it has been found that tapes made with paper backings impregnated with latices including copolymer of acrylonitrile together with a phenolic resin in amount substantially greater than 7% cannot be applied in sharp curve fashion without tearing. Consequently, when used as a masking tape for painting, the line of demarcation of paint is not continuously smooth but rather ragged and broken, requiring refinishing of the painted surface. Moreover, it was found that tapes with a lack of flexibility tended to adhere to uneven or curved surfaces with difficulty. They would tend to lift or curl easily and often fell from the surface to which they were applied. When they lifted, even slightly, paint would seep underneath the tape again destroying the purpose of the masking tape.

Various types of fibrous webs may be employed as the sheet material of this invention, so long as the web is porous and can be completely saturated. The web may be made in part or in whole from wood, rope or rag fibers or other fibrous material, natural or synthetic. Preferably, paper webs of the conventional type employed as backings for normally tacky and pressure-sensitive adhesive tapes, such as those formed of kraft pulp and the like, are used. The paper may be flat or it may be creped, crimped, embossed or otherwise treated so as to provide rugosities or corrugations whereby stretchability of the sheet is increased.

The elastomeric copolymer suitable for use in this invention should contain nitrogen. Preferably the elastomeric polymer contains a nitrile group and is in the form of a copolymer of butadiene or some other conjugated diene and an unsaturated polymerizible nitrile, e. g. acrylonitrile, alpha-methacrylonitrile, alpha ethacrylonitrile, alpha isopropacrylonitrile, etc. In place of an unsaturated nitrile, a nitrogen containing phenolic resin reactive comonomer such as acrylamide or vinyl pyridine may replace all or part of the acrylonitrile. The nitrogen containing comonomer, preferably acrylonitrile, should be at least about 5%, but preferably no more than about 50% of the copolymer to insure a rubbery polymer. Other polymers or copolymers of the elastomeric (i. e. rubbery) type such as butadiene-styrene, natural rubber, vinyl chloride, copolymers of vinyl chloride with other monomers such as vinyl acetate, vinylidene chloride, etc., chloroprene and similar compatible elastomeric polymers may be blended with the nitrile copolymer and reactive phenolic resin without impairing their desirable interaction. The acrylonitrile copolymer and reactive phenolic resin result in improved properties in proportion as they are used in the impregnating composition, and little benefit is obtained unless at least about 10% of the elastomeric component of the impregnant is made up of acrylonitrile copolymer. Preferably, substantial amounts of the acrylonitrile copolymer are used in the composition; that is, at least approximately half of the elastomer content of the impregnant. If desired, terpolymers employing more than two monomers, one of which is a nitrogen containing polymerizable comonomer may be used in similar amounts.

As heretofore indicated the phenolic-aldehyde resin added to the impregnant in the described minor amounts must be reactive when heated or catalyst activated, must be water soluble or at least readily dispersible in water at a neutral pH or above, and must be stable when admixed with the latices to form the impregnant. Exemplary of such reactive phenolic resins are those formed by the alkaline condensation of formaldehyde and phenol in a ratio of from about 1.1 to about 2¼ mols of formaldehyde per mol of phenol and the reaction arrested while the resin is still in the heat-advancing stage. Substituted phenols such as resorcinol or cresol may be employed, and other aldehydes than formaldehyde such as acetaldehyde may be used. The pH of such resins usually range from 7 to 11. The resins may be heat-curing in themselves or may require a conventional catalyst to increase the rate of or complete their cure. Phenolic resins which require treatment or the pressure of another ingredient to render them heat-reactive, such as the Novaloc type resins may be employed, so long as there results in the impregnant a resin which is rendered water soluble or dispersible and heat-reactive, which may be due to additional formaldehyde derived from an additive such as hexamethylene diamine. It is to be appreciated that such resins are included within the scope of the term heat-reactive phenolic-aldehyde resin as used herein.

Other ingredients of the type conventionally employed in latex impregnant may be included within the impregnated composition used in this invention. Exemplary of such materials are conventional antioxidants, such as hydroquinone monobenzyl ether, used to stabilize the polymer during curing and aging, pigments, dyes, etc.

In accordance with this invention, the fibrous web is impregnated with the latex in amount sufficient to enable incorporation of the dry solids of the impregnant into the sheet in amount approximately 30% to 150% by weight of the dry non-impregnated sheet. After impregnation, the saturated webs are preferably heated to cure the resin to obtain at least partial polymerization thereof. Relatively long curing times at low temperatures or short times at high temperatures may be employed. It is possible to employ the wet tensile strength as an indication of cure; and, hence, in accordance with this invention the degree of cure considered desirable is that sufficient to result in at least a 25% increase in the wet tensile strength of the backing after cure, as compared to before cure. Preferably, the backings are cured from 10 to 600 seconds at a temperature of 250° to 400° F. Such curing will normally result in an increase of the wet tensile strength of the sheet to several hundred times that of its original value. It will be appreciated that, if during manufacture only slight curing is performed, subsequent use of the tape in an application wherein the backing is exposed to elevated temperatures will result in substantially complete curing of the backing. Occasionally, this characteristic of curing in service is most desirable.

The following are examples of impregnated backings for adhesive sheets and tapes, formed in accordance with this invention. Examples are also given of products formed in accordance with prior practice to compare the products of the invention and those not of the invention. It will be appreciated that the materials and proportions listed are exemplary, and the invention is not to be construed as limited thereto. In the examples, unless otherwise indicated, all parts and percentages are by weight.

EXAMPLE I

To compare backings formed in accordance with this invention and, hence, including minor amounts of a phenolic resin with sheets formed with impregnants excluding the phenolic resin, the following samples were prepared.

Sample A

A 30-pound creped saturating paper was saturated with 80% of its weight (dry basis) with a latex composition consisting of 60 parts (dry basis weight) of a butadiene-acrylonitrile copolymer (75 percent butadiene, 25 percent acrylonitrile and a Mooney viscosity of about 40), 40 parts of a butadiene-styrene copolymer (50 percent butadiene, 50 percent styrene and a Mooney about 40) and one part of an antioxidant, hydroquinone monobenzyl ether. Impregnation was accomplished with conventional squeeze-roll equipment and the wet sheet dried in a festoon-type of air circulating oven.

Sample B

A 30-pound creped saturating paper was saturated with an equal weight of a latex composition consisting of 70 parts of a butadiene-acrylonitrile copolymer (75 percent butadiene, 25 percent acrylonitrile, Mooney of 40), 30 parts of a butadiene-styrene copolymer (10 percent butadiene, 90 percent styrene, a brittle copolymer) and one part of the same antioxidant as A. The backing was dried in an air-circulating oven.

*Sample C*

A 30-pound creped saturating paper was saturated with 80% of its weight with a latex composition consisting of 60 parts of a butadiene-acrylonitrile copolymer (75 percent butadiene, 25 percent acrylonitrile, Mooney of 40), 37 parts of a butadiene-styrene copolymer (50 percent butadiene, 50 percent styrene, Mooney of 40), three parts of a heat-curing phenol-formaldehyde resin (made by reacting 2 mols of formaldehyde with 1.0 mol of phenol under alkaline conditions and stopping the reaction in the polymerized but still water soluble stage). The impregnation and drying was carried out in the same manner as in A. The cure was conducted in a separate air-circulating oven for one minute at 375° F. The samples were then coated in conventional manner with a normally tacky and pressure-sensitive adhesive formed from:

| | Parts |
|---|---|
| Crude rubber | 100 |
| Rosin dehydrogenated | 90 |
| Aluminum hydrate | 90 |
| Mineral oil | 30 |
| Antioxidant | 2 | and formed into rolls of pressure-sensitive adhesive tape. In the following table are given the comparative characteristics of the product thus formed. To test delamination resistance a roll of tape is placed on an unwinding machine that measures pulling force. The unwinding speed of the machine is then accelerated until delamination of tape backing occurs, and a steady state reading of pulling force can be obtained. The dry delamination resistance is obtained after aging the samples for six days at 150° F. and 35% relative humidity. Wet delamination resistance readings are measured after aging the samples three days at 150° F. and 100% relative humidity. Tapes that exhibit 110 ounces/inch adhesion to backing when tested for dry delamination resistance are considered excellent. Those that do not delaminate at 90 ounces/inch are good. Those that do not delaminate at 70 ounces/inch are considered fair, and those delaminating at lower values are considered poor. In testing wet delamination resistance, 70 ounces/inch is considered excellent and 30 ounces/inch is poor.

TABLE I

| Ex. No. | Acrylonitrile Content in Percent | Resin Content in Percent | Wet Tensile, Lb./In. | Delam. Resist. Dry | Delam. Resist. Wet | Edge Tear (Lb.) | Stiffness (mg./inch) |
|---|---|---|---|---|---|---|---|
| A | 60 | 0 | 2 | Fair | Poor | 3.9 | 32 |
| B | 70 | 0 | 2 | Exc. | do | 1.9 | 50 |
| C | 60 | 3 | 14 | Exc. | Exc. | 3.5 | 32 |

EXAMPLE II

The following experiments were designed to enable comparison of tapes formed in accordance with this invention and employing varying types and amounts of elastomeric polymers and types and amounts of phenolic-aldehyde resins, and to enable comparison of tapes formed in accordance with this invention and those formed with similar impregnants, wherein substantially higher amounts of phenolic-adehyde resin are used.

*Sample A*

A 30-pound creped saturating paper was saturated with an equal weight of a latex composition consisting of 99 parts of a butadiene-acrylonitrile copolymer (75 percent butadiene, 25 percent acrylonitrile, Mooney of 40), one part of a water dispersible phenol-formaldehyde resin (made by reacting under alkaline conditions 1.5 mols of formaldehyde with 1.0 mol of phenol), 0.1 part of hexamethylene tetramine and one part of antioxidant. The dried sheet was subsequently cured in an air-circulating oven for one minute at 370° F.

*Sample B*

A 30-pound creped saturating paper was saturated with 90% of its weight with a latex composition consisting of 80 parts of a butadiene-acrylonitrile copolymer (75 percent butadiene, 25 percent acrylonitrile, Mooney of 40), 18 parts of a butadiene-styrene copolymer (50 percent butadiene, 50 percent styrene, Mooney of 75), two parts of a phenol-formaldehyde resin (made by reacting 2.1 mols of formaldehyde with 1.0 mol of phenol under alkaline conditions and stopping the reaction in the still water soluble state), and one part of antioxidant. The dried backing was cured for three quarters of a minute at 370° F.

*Sample C*

A 30-pound creped saturating paper was saturated with 75% of its weight with a latex composition consisting of 75 parts of a butadiene-acrylonitrile copolymer (75 percent butadiene, 25 percent acrylonitrile, Mooney of 40), 23 parts of a butadiene-styrene copolymer (50 percent butadiene, 50 percent styrene, Mooney of 75), two parts of a phenol-formaldehyde resin (made by reacting 1.9 mols of formaldehyde with 1.0 mol of phenol under alkaline conditions and stopping the reaction in the still soluble state), and one part of antioxidant. This dried sheet was cured for one minute at 390° F.

*Sample D*

A 30-pound creped saturating paper was saturated with 75% of its weight with a latex composition consisting of 60 parts of butadiene-acrylonitrile copolymer (75 percent butadiene, 25 percent acrylonitrile, Mooney of 40), 37 parts of butadiene-styrene (50 percent butadiene, 50 percent styrene, Mooney of 75), three parts of a resorcinol-formaldehyde resin (made by reacting under acid conditions 0.8 mols of formaldehyde with 1.0 mol of resorcinol), 0.3 parts of hexamethylene tetramine, and one part of antioxidant. This backing was cured one minute at 200° F.

*Sample E*

A 30-pound creped saturating paper was saturated with an equal weight of a latex composition consisting of 10 parts of a butadiene-acrylonitrile copolymer (60 percent butadiene, 40 percent acrylonitrile, Mooney of 50), 87 parts of butadiene-styrene copolymer (50 percent butadiene, 50 percent styrene, Mooney of 75), three parts of phenol-formaldehyde resin (made by reacting 2.0 mols of formaldehyde under alkaline conditions with 1.0 mol of phenol and stopping the reaction in the still water soluble stage), and one part of antioxidant. The dried backing was cured for 15 seconds at 420° F.

*Sample F*

A 30-pound creped saturating paper was saturated with 80% of its weight with a latex composition consisting of 40 parts of butadiene-acrylonitrile copolymer (75 percent butadiene, 25 percent acrylonitrile, Mooney of 40), 55 parts of butadiene-styrene copolymer (50 percent butadiene, 50 percent styrene, Mooney of 50), 5 parts of a phenol-formaldehyde resin made by reacting 2.0 mols of formaldehyde with 1.0 mol of phenol under alkaline conditions and stopping the reaction in the still water soluble stage), and one part of antioxidant. The dried backing was cured for one minute at 375° F.

*Sample G*

A 30-pound creped saturating paper was saturated with 80% of its weight with a latex composition consisting of 70 parts of butadiene-acrylonitrile copolymer (75 percent butadiene, 25 percent acrylonitrile, Mooney of 40), 20 parts of butadiene-styrene (50 percent butadiene, 50 percent styrene, Mooney of 50), 10 parts of phenol-formaldehyde (made by reacting 2.0 mols of formaldehyde with 1.0 mol of phenol under alkaline conditions and stopping the reaction in the still soluble state), and one part of antioxidant. The dried backing was cured for one minute at 375° F.

Normally tacky and pressure-sensitive adhesive tapes were formed from the samples as in Example I. The following table presents comparative data relating to the characteristics of the tapes made from the backings thus formed.

TABLE II

| Sample | Paper | Acrylonitrile Copolymer Content, Percent | Resin Content, Percent | Wet Tensile, Lbs./In. | Delam. Resis. | | Edge Tear, Lbs. |
|---|---|---|---|---|---|---|---|
| | | | | | Dry | Wet | |
| A | 30 # Crepe | 99 | 1 | 10 | Exc | Exc | 3.8 |
| B | do | 80 | 2 | 8 | Exc | Exc | 3.9 |
| C | do | 75 | 2 | 18 | Exc | Exc | 3.2 |
| D | do | 60 | 3 | 15 | Exc | Exc | 3.4 |
| E | do | 10 | 3 | 10 | Exc | Exc | 3.0 |
| F | do | 40 | 5 | 12 | Exc | Exc | 3.3 |
| G | do | 70 | 10 | 16 | Exc | Exc | 2.1 |

As may be seen, the characteristics of Samples A to F, all formed in accordance with this invention, are those considered desirable in tape backings. Sample G indicates good wet tensile strength and delamination resistance in the product formed, but the poor edge tear that results from the described treatment renders the backing sheet inferior for its intended purpose.

EXAMPLE III

The following experiments were conducted to indicate the use of this invention in the treatment of flat papers, rather than creped papers as used in the preceding examples.

Sample A

A 32-pound flat saturating paper was saturated with 80% of its weight with a latex composition consisting of 60 parts of a butadiene-acrylonitrile copolymer (75 percent butadiene, 25 percent acrylonitrile, Mooney of 40), 40 parts of butadiene-styrene copolymer (50 percent butadiene, 50 percent styrene, Mooney of 50), and one part of antioxidant. The backings were dried in a festoon.

Sample B

A 32-pound flat paper was saturated with 80% of its weight with a latex composition consisting of 60 parts of a butadiene-acrylonitrile copolymer (75 percent butadiene, 25 percent acrylonitrile, Mooney of 40), 37 parts of a butadiene-styrene copolymer (50 percent butadiene, 50 percent styrene, Mooney of 50), 3 parts of a phenol-formaldehyde resin (made by reacting 2.2 mols of formaldehyde with 1.0 mol of phenol under alkaline conditions and stopping the reaction in the still soluble stage), and one part of antioxidant. The dried backing was cured for one minute at 380° F.

Sample C

A 32-pound flat paper was saturated with 80% of its weight with a latex composition consisting of 70 parts of butadiene-acrylonitrile copolymer (75 percent butadiene, 25 percent acrylonitrile, Mooney of 40), 17 parts of butadiene-styrene copolymer (50 percent butadiene, 50 percent styrene, Mooney of 50), 13 parts of a phenol-formaldehyde resin (made by reacting 2.2 mols of formaldehyde with 1.0 mol of phenol under alkaline conditions and stopping the reaction in the still water soluble stage), and one part of antioxidant. The dried backing was cured for one minute at 370° F. Tapes were formed as in Example I and when tested exhibited the following characteristics.

TABLE III

| Sample | Paper | Acrylonitrile Content, Percent | Resin Content, Percent | Wet Tensile, Lb./In. | Delam. Resistance | | Elongation, Percent | Edge Tear, Lbs. |
|---|---|---|---|---|---|---|---|---|
| | | | | | Dry | Wet | | |
| A | 32 # Flat | 60 | 0 | 2 | Fair | Poor | 12.8 | 4.9 |
| B | do | 60 | 3 | 20 | Exc | Exc | 12.6 | 4.4 |
| C | do | 70 | 13 | 20 | Exc | Exc | 6.2 | 2.1 |

In the foregoing table the data clearly indicates that the product formed in accordance with this invention, Sample B, exhibits good characteristics in all essentials. Sample A, prepared without the phenolic resin, while exhibiting good elongation and edge tear exhibits only fair dry delamination resistance and relatively poor wet delamination resistance. Sample C, which includes in the composition the phenolic-aldehyde resin in amount greater than used in accordance with this invention, exhibits good delamination resistance and wet tensile strength, but exhibits poor elongation and edge tear and is, generally, an inferior backing.

It will be appreciated that many variations in the invention described herein may become apparent to those skilled in the art to which this invention applies. It is to be appreciated that such variations are within the concept of the invention described herein.

What is claimed is:

1. A paper-backed normally tacky and pressure-sensitive adhesive tape having improved characteristics of wet tensile strength and delamination resistance comprising a unified paper web internally bonded with a composition comprising bonding particles including an elastomeric copolymer containing a phenolic-reactive N-containing comonomer selected from the group consisting of unsaturated polymerizible nitriles, acrylamides and vinyl pyridines and up to about 7% by weight of impregnant solids of a water-dispersible heat-reactive phenolic-aldehyde resin, said web having at least one major surface thereof coated with a normally tacky and pressure-sensitive adhesive, and said internally bonded web having internal strength sufficient to render it immune to splitting and delamination when in a roll of the tape it is subject to the forces exerted by the adhesive of an overlying ply of the tape in the unwinding thereof.

2. A paper-backed normally tacky and pressure-sensitive tape in accordance with claim 1 wherein the elastomeric copolymer comprises a copolymer of a conjugated diene and acrylonitrile.

3. A paper-backed normally tacky and pressure-sensitive tape in accordance with claim 1 wherein the bonding particles include a mixture of an elastomeric copolymer of butadiene and acrylonitrile and an elastomeric copolymer of butadiene and styrene.

4. A paper-backed normally tacky and pressure-sensitive tape in accordance with claim 1 wherein the phenolic-aldehyde resin comprises the alkaline condensation product of formaldehyde and a phenol in a ratio of from about 1.1 to about 2¼ mols of formaldehyde per mol of phenol.

5. A paper-backed normally tacky and pressure sensitive adhesive tape having improved characteristics of wet tensile strength and delamination resistance comprising a unified paper web internally bonded with a composition comprising bonding particles including a major proportion of an elastomeric copolymer of butadiene and acrylonitrile and a minor proportion of an elastomeric copolymer of butadiene and styrene and up to about 7% by weight of impregnant solids of a water-dispersible, heat-reactive, phenol-formaldehyde resin, said web having at least one major surface thereof coated with a normally tacky and pressure-sensitive adhesive, and said internally bonded web having internal strength sufficient to render it immune to splitting and delamination when in a roll of the tape it is subject to the forces exerted by the adhesive of an overlying ply of the tape in the unwinding thereof.

6. A paper-backed normally tacky and pressure-sensitive adhesive tape having improved characteristics of wet tensile strength and delamination resistance comprising a unified paper web internally bonded with a composition comprising bonding particles including an elastomeric copolymer containing a phenolic reactive N-containing comonomer selected from the group consisting of unsaturated polymerizable nitriles, acrylamides and vinyl pyridines and a minor but effective amount of a water-dispersible, heat-reactive, phenolic aldehyde resin, said web having at least one major surface thereof coated with a normally tacky and pressure-sensitive adhesive, and said internally bonded web having internal strength sufficient to render it immune to splitting and delamination when in a roll of the tape it is subject to the forces exerted by the adhesive of an overlying ply of the tape in the unwinding thereof.

7. A paper-backed normally tacky and pressure sensitive adhesive tape in accordance with claim 6 wherein the elastomeric copolymer comprises a copolymer of a conjugated diene and acrylonitrile.

8. A paper-backed normally tacky and pressure-sensitive adhesive tape in accordance with claim 6 wherein the phenolic-aldehyde resin comprises the alkaline condensation product of formaldehyde and a phenol in a ratio of from about 1.1 to about 2¼ mols of formaldehyde per mol of phenol.

9. A paper-backed normally tacky and pressure-sensitive adhesive tape having improved characteristics of wet tensile strength and delamination resistance comprising a unified paper web internally bonded with a composition comprising bonding particles including an elastomeric copolymer containing an aldehyde resin reactive N-containing comonomer selected from the group consisting of unsaturated polymerizable nitriles, acrylamides and vinyl pyridines and a minor but effective amount of a water-dispersible, heat-reactive, aldehyde resin, said web having at least one major surface thereof coated with a normally tacky and pressure-sensitive adhesive, and said internally bonded web having internal strength sufficient to render it immune to splitting and delamination, when in a roll of the tape, it is subject to the forces exerted by the adhesive of an overlying ply of the tape in the unwinding thereof.

10. A paper-backed normally tacky and pressure-sensitive adhesive tape having improved characteristics of wet tensile strength and delamination resistance comprising a unified paper web internally bonded with a composition comprising bonding particles including an elastomeric copolymer containing an aldehyde resin reactive N-containing comonomer selected from the group consisting of unsaturated polymerizable nitriles, acrylamides and vinyl pyridines and up to about 7% by weight of impregnant solids of a water-dispersible, heat-reactive, aldehyde resin, said web having at least one major surface thereof coated with a normally tacky and pressure-sensitive adhesive, and said internally bonded web having internal strength sufficient to render it immune to splitting and delamination, when in a roll of the tape, it is subject to the forces exerted by the adhesive of an overlying ply of the tape in the unwinding thereof.

11. A paper-backed normally tacky and pressure-sensitive adhesive tape having improved characteristics of wet tensile strength and delamination resistance comprising a unified paper web internally bonded with a composition comprising bonding particles including an elastomeric copolymer of butadiene and acrylonitrile and a minor but effective amount of a water-dispersible, heat-reactive, aldehyde resin, said web having at least one major surface thereof coated with a normally tacky and pressure-sensitive adhesive and said internally bonded web having internal strength sufficient to render it immune to splitting and delamination, when in a roll of the tape, it is subject to the forces exerted by the adhesive of an overlying ply of the tape in the unwinding thereof.

12. A paper-backed normally tacky and pressure-sensitive adhesive tape having improved characteristics of wet tensile strength and delamination resistance comprising a unified paper web internally bonded with a composition comprising bonding particles including an elastomeric copolymer of butadiene and acrylonitrile and up to about 7% by weight of impregnant solids of a water-dispersible, heat-reactive, aldehyde resin, said web having at least one major surface thereof coated with a normally tacky and pressure-sensitive adhesive and said internally bonded web having internal strength sufficient to render it immune to splitting and delamination, when in a roll of the tape, it is subject to the forces exerted by the adhesive of an overlying ply of the tape in the unwinding thereof.

13. A paper-backed normally tacky and pressure-sensitive adhesive tape having improved characteristics of wet tensile strength and delamination resistance comprising a unified paper web internally bonded with a composition comprising bonding particles including an elastomeric copolymer containing a formaldehyde resin reactive N-containing comonomer selected from the group consisting of unsaturated polymerizable nitriles, acrylamides and vinyl pyridines and a minor but effective amount of a water-dispersible, heat-reactive, formaldehyde resin, said web having at least one major surface thereof coated with a normally tacky and pressure-sensitive adhesive, and said internally bonded web having internal strength sufficient to render it immune to splitting and delamination, when in a roll of the tape, it is subject to the forces exerted by the adhesive of an overlying ply of the tape in the unwinding thereof.

14. A paper-backed normally tacky and pressure-sensitive adhesive tape having improved characteristics of wet tensile strength and delamination resistance comprising a unified paper web internally bonded with a composition comprising bonding particles including an elastomeric copolymer containing a formaldehyde resin reactive N-containing comonomer selected from the group consisting of unsaturated polymerizable nitriles, acrylamides and vinyl pyridines and up to about 7% by weight of impregnant solids of a water-dispersible, heat-reactive, formaldehyde resin, said web having at least one major surface thereof coated with a normally tacky and pressure-sensitive adhesive, and said internally bonded web having internal strength sufficient to render it immune to splitting and delamination, when in a roll of the tape, it is subject to the forces exerted by the adhesive of an overlying ply of the tape in the unwinding thereof.

15. A paper-backed normally tacky and pressure-sensitive adhesive tape having improved characteristics of wet tensile strength and delamination resistance comprising a unified paper web internally bonded with a composition comprising bonding particles including an elastomeric copolymer of butadiene and acrylonitrile and a minor but effective amount of a water-dispersible, heat-reactive, formaldehyde resin, said web having at least one major surface thereof coated with a normally tacky and pressure-sensitive adhesive and said internally bonded web having internal strength sufficient to render it immune to splitting and delamination, when in a roll of the tape, it is subject to the forces exerted by the adhesive of an overlying ply of the tape in the unwinding thereof.

16. A paper-backed normally tacky and pressure-sensitive adhesive tape having improved characteristics of wet tensile strength and delamination resistance comprising a unified paper web internally bonded with a composition comprising bonding particles including an elastomeric copolymer of butadiene and acrylonitrile and up to about 7% by weight of impregnant solids of a water-dispersible, heat-reactive, formaldehyde resin, said web having at least one major surface thereof coated with a normally tacky and pressure-sensitive adhesive and said internally bonded web having internal strength sufficient to render it immune to splitting and delamination, when in a roll of the tape, it is subject to the forces exerted by the adhesive of an overlying ply of the tape in the unwinding thereof.

References Cited in the file of this patent

UNITED STATES PATENTS

| | | |
|---|---|---|
| 2,410,078 | Kellgren | Oct. 29, 1946 |
| 2,592,550 | Engel | Apr. 15, 1952 |
| 2,597,087 | Cowgill | May 20, 1952 |
| 2,767,152 | Bierman | Oct. 20, 1952 |
| 2,708,192 | Joesting | May 10, 1955 |
| 2,726,222 | Palmquist | Dec. 6, 1955 |
| 2,758,953 | Cottle | Aug. 14, 1956 |
| 2,774,687 | Nottebohm | Dec. 18, 1956 |

FOREIGN PATENTS

| | | |
|---|---|---|
| 130,997 | Australia | Feb. 3, 1949 |